United States Patent Office 3,325,495
Patented June 13, 1967

3,325,495
PURINE CARBOXAMIDES
Harvey E. Alburn, West Chester, and William Dvonch, Radnor, Pa., assignors to American Home Products Corporation, New York, N.Y., a corporation of Delaware
No Drawing. Filed Jan. 26, 1965, Ser. No. 428,225
11 Claims. (Cl. 260—252)

This invention relates to new purinoyl compounds and more particularly to purinoyl derivatives of amines and amino acids.

The new compounds of the present invention considered in their broadest aspect include those compounds encompassed within the following general formula:

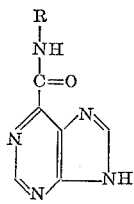

wherein R is selected from the group consisting of cycloalkyl having not more than 6 carbon atoms; cycloalkyl carboxylic acid having not more than 7 carbon atoms;

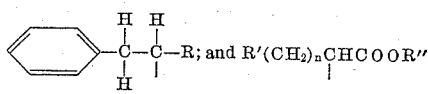

wherein R' is selected from the group consisting of —OH, $(CH_3)_2CH$—, —$CH_3$, phenyl; $n$ has a value of from 0 to 1 inclusive and R'' is lower alkyl. In the case of the α-alkylphenethyl compounds, it should be noted that the phenyl moiety can have thereon non-interfering substituents in the place of its hydrogen atoms. Thus, one or more of said hydrogens may be replaced by chlorine or bromine atoms, by nitro or (lower)alkyl groups and by halo(lower)alkyl groups, such as trifluoromethyl. Such substituted compounds possess substantially the same properties as the compounds specifically claimed herein.

The claimed compounds are prepared according to the method of the present invention by reacting 6-trichloromethylpurine with an amine reactant in the presence of an alkali metal carbonate, preferably sodium bicarbonate. This reaction may be represented as follows:

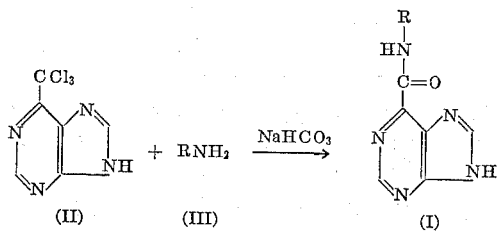

As shown above, the new compounds of the present invention (I) are prepared by reacting 6-trichloromethylpurine (II) with an amine (III).

As will be apparent from the accompanying examples, the actual optimum conditions for the above synthesis vary with the kind of amine reactant ($RNH_2$) which is employed.

Starting material (II); namely, the 6-trichloromethylpurine, may be prepared according to the method described in J. Org. Chem. 27, 3545–9 (1962), S. Cohen et al. According to this method, 6-methylpurine in a trifluoroacetic acid solution is converted to 6-trichloromethylpurine (II) by reaction with sulfonyl chloride or N-chlorosuccinimide. The selected amines (III) used as reactants are well known in the art, particularly, the alicyclic amines and the D-amphetamine. The α-amino acids are likewise well known to those skilled in the art or are preparable by known methods.

The new compounds of the present invention possess appetite suppressant properties and are therefore useful as appetite inhibitors. When utilized for such purposes, the new compounds may be administered alone or preferably in composition form in which event the new compound is combined with an inert pharmaceutically acceptable carrier. When its is desired to administer these new compounds in an oral manner, the new compound, as the active principle, may be combined with startch or milk sugar and tableted according to conventional technique. Alternatively, liquid components, either as solutions or suspensions of the active principle and carrier, may be prepared. Such liquid composition may include suitable coloring or flavoring agents as desired and may be utilized orally, intravenously or parenterally. Unlike most appetite inhibitors the claimed compounds do not exhibit central nervous system activity.

The quantity of the compound used to achieve the desired effect will of course vary depending on the conditions to be treated, the manner in which the compound is to be administered and other conditions. Normally, a dosage rate of about 10 mg. per day will be used for the initial treatments. Higher amounts can be used when required.

Reference now to the examples which follow will provide a better understanding of the method by which the new compounds of the present invention are prepared as well as a better understanding of the compounds themselves.

*Example I*

6-trichloromethylpurine (4.75 g.; 20.0 mmole) is added to 1 - aminocyclopentanecarboxylic acid (2.36 g.; 18.0 mmole) dissolved in water (200 ml.) containing sodium bicarbonate (7.00 g.) with stirring. After 7 hours, complete solution occurs. The solution is acidified to pH 1 with concentrated hydrochloric acid and let stand at 5° C. overnight. The precipitate of purinoic acid is filtered off, and the mother liquor taken to dryness in vacuo. The residue is taken up in 60 ml. of water. Shortly after it is in solution, sheafs of fine needles begin to separate out and are collected after storage at 5° C. overnight. The crystals are dissolved in 200 ml. hot water, and the solution is decolorized and concentrated to a small volume to obtain crystals of N - purinoyl - 1 - aminocyclopentanecarboxylic acid (0.72 g.; 12% of theory), M.P. 269–280° C.

*Analysis.*—Calcd. for $C_{12}H_{13}N_5O_3 \cdot 2H_2O$: C, 46.34; H, 5.53; N, 22.50. Found: C, 46.34; H, 5.40; N, 22.74. Spectrum:

$\lambda_{max.}^{KBr}$ 5.85 (carboxyl C=O), 5.99 (amide C=O) $\mu$

*Example II*

Cyclopropylamine (3.43 g.; 60 mmole) is added to a 2% sodium bicarbonate solution (500 ml.) with stirring. 6-trichloromethylpurine (4.75 g.; 20 mmole) is added, and the mixture stirred for 6 hours. The pH is adjusted to 4 with concentrated hydrochloric acid, and the solution freeze-dried. The residue is extracted with acetone (500 ml.) followed by ethanol (200 ml.) The ethanol extract is decolorized and concentrated to dryness in vacuo. By repeated crystallizations from ethanol: chloroform (50:50) pure N-cyclopropyl-9H-purine-6-carboxamide is obtained (0.22 g.; 5% of theory), M.P. >240° C.

*Analysis.*—Calcd. for $C_9H_9N_5O$: C, 53.20; H, 4.46; N, 34.40. Found: C, 53.37; H, 4.81; N, 33.5. Spectrum:

$\lambda^{KBr}_{max.}$ 6.05 (amide C=O) $\mu$

Example III

Following the procedure of Example II, N-cyclohexyl-9H-purine-6-carboxamide is prepared by reacting 6-trichloromethylpurine with cyclohexylamine.

Example IV

Following the method of Example II, N-cyclobutyl-9H-purine-6-carboxamide is prepared by reacting 6-trichloromethylpurine with cyclobutylamine.

Example V

The solution obtained from 6-trichloromethylpurine (2.4 g. ; 10 mmole), L-serine (2.0 g.; 19 mmole), and sodium bicarbonate (4.0 g.; 48 mmole) in water (100 ml.) stirred for 6 hours is treated with Dowex-50 (H) (45 g.; 78% moisture) for 30 min. The mixture is filtered; the resin is extracted with boiling water (200 ml.); and the mixture filtered again. The combined filtrates are brought to dryness, and the residue extracted with ethanol (300 ml.). The filtered extract is concentrated to a small volume and stored at 5° C. The first gummy deposit is discarded. The second crop is the crude N-purinoyl-L-serine ethyl ester (0.46 g.; 16%). It is purified by dissolution at pH 8 and precipitation at pH 3.

*Analysis.*—Calcd. for $C_{11}H_{13}O_4N_5$: C, 47.33; H, 4.69; N, 25.18; OEt, 16.11. Found: C, 47.00; H, 4.70; N, 24.64; OEt, 16.1. Spectrum:

$\lambda^{KBr}_{max.}$ 5.77 (ester C=O), 6.05 (amide C=O) $\mu$

Example VI

Following the general procedure of Example V, N-purinoyl-leucine methyl ester is prepared by reacting 6-trichloromethylpurine with leucine and crystallizing from methanol.

Example VII

According to the general method of previous examples 6-trichloromethylpurine is recated with alanine to prepare N-purinoylalanine propyl ester upon crystallization from propanol.

Example VIII

According to the general method of previous examples, 6-trichloromethylpurine is reacted with phenylalanine to prepare N-purinoylphenylalanine ethyl ester upon crystallization from ethanol.

Example IX

According to the general method of previous examples, 6-trichloromethylpurine is reacted with valine to prepare N-purinoylvaline methyl ester upon crystallization from methanol.

Example X

D-amphetamine (2.70 g. [2.96 ml.], 0.02 mole) was added to a 5% sodium bicarbonate solution (200 ml.) with stirring. The mixture was heated under reflux to 95°, and 6-trichloromethylpurine (2.38 g., 0.01 mole) was added. After 2 hrs., the mixture was cooled in an ice-bath, and the supernatant containing a yellow precipitate was decanted from the brown oil that deposited. The precipitate was filtered off and combined with next two that deposited after storage at 5° overnight and after adjustment of the second mother liquor to pH 1.0 with hydrochloric acid.

The combined crop of crude product N-($\alpha$-methylphenethyl)-9H-purine-6-carboxamide (0.63 g., 22% yield) was recrystallized from ethanol: water to give 0.39 g. of pure material, M.P. 215–19°.

*Analysis.*—Calcd. for $C_{15}H_{15}N_5O$: C, 64.01; H, 5.37; N, 24.89. Found: C, 64.15; H, 5.10; N, 24.59. Spectrum:

$\lambda^{KBr}_{max.}$ 5.96 (amide C=O) $\mu$

While the foregoing invention has been described in the specific examples set forth with considerable specificity, it is to be undersood that such language was for the purpose of providing a clear description and is not to be construed as limiting the invention. The same is to be limited only by the claims attached hereto.

The invention claimed is:
1. A compound of the formula:

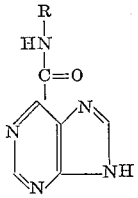

wherein R is selected from the group consisting of cycloalkyl having not more than 6 carbon atoms; cycloalkyl carbxylic acid having not more than 7 carbon atoms;

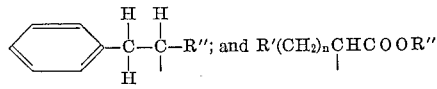

wherein R′ is selected from the group consisting of —OH, $(CH_3)_2CH—$, —$CH_3$, phenyl; $n$ has a value of from 0 to 1 inclusive and R″ is lower alkyl.

2. N-($\alpha$-methylphenethyl)-9H-purine-6-carboxamide.
3. N-purinoyl-1-aminocyclopentane carboxylic acid.
4. N-cyclopropyl-9H-purpine-6-carboxamide.
5. N-cyclohexyl-9H-purine-6-carboxamide.
6. N-cyclobutyl-9H-purine-6-carboxamide.
7. N-purinoyl-L-serine ethyl ester.
8. N-purinoyl leucine methyl ester.
9. N-purinoylalanine propyl ester.
10. N-purinoylphenylalanine ethyl ester.
11. N-purinoylvaline methyl ester.

References Cited

UNITED STATES PATENTS

| | | | |
|---|---|---|---|
| 2,852,506 | 9/1958 | Goldman et al. | 260—252 |
| 3,098,074 | 7/1963 | Hitchings et al. | 260—252 |
| 3,242,193 | 3/1966 | Sarett et al. | 260—326.13 |

FOREIGN PATENTS

| | | |
|---|---|---|
| 799,384 | 8/1958 | Great Britain. |

OTHER REFERENCES

Cohen et al.: Biochemistry, vol. 2, 1963, pp. 176–181.
Giner-Sorolla et al.: Jour. Amer. Chem. Soc., vol. 80, 1958, pp. 3932–3937.

ALEX MAZEL, *Primary Examiner.*
MARY U. O'BRIEN, *Assistant Examiner.*